United States Patent
Hiller

(10) Patent No.: US 12,445,204 B2
(45) Date of Patent: Oct. 14, 2025

(54) COMMUNICATIONS WITHOUT POWER TRANSMISSION

(71) Applicant: The Boeing Company, Arlington, VA (US)

(72) Inventor: Nathan D. Hiller, Irvine, CA (US)

(73) Assignee: The Boeing Company, Arlington, VA (US)

( * ) Notice: Subject to any disclaimer, the term of this patent is extended or adjusted under 35 U.S.C. 154(b) by 238 days.

(21) Appl. No.: 18/447,041

(22) Filed: Aug. 9, 2023

(65) Prior Publication Data

US 2025/0055569 A1 Feb. 13, 2025

(51) Int. Cl.
H04B 10/50 (2013.01)
H04B 10/118 (2013.01)

(52) U.S. Cl.
CPC ......... H04B 10/503 (2013.01); *H04B 10/118* (2013.01)

(58) Field of Classification Search
CPC .... H04B 10/11–118; H04B 10/50–588; H04B 10/80; H04B 10/90
See application file for complete search history.

(56) References Cited

U.S. PATENT DOCUMENTS

2004/0264539 A1* 12/2004 Narayan ............... H04B 10/572 372/102

\* cited by examiner

*Primary Examiner* — Casey L Kretzer
(74) *Attorney, Agent, or Firm* — Yee & Associates, P.C.

(57) ABSTRACT

A net zero power communications system comprising a laser beam generator, a black body, a cooled cavity, an optical absorber in the cooled cavity, and a controller. The controller is configured to identify information for transmission. The controller is configured to control the laser beam generator to emit laser beam pulses at the optical absorber layer that changes a temperature of the optical absorber layer with a pattern that causes the optical absorber layer to emit black body radiation from the cooled cavity to thereby encode the information.

28 Claims, 10 Drawing Sheets

COMMUNICATIONS WITHOUT POWER TRANSMISSION

BACKGROUND INFORMATION

1. Field

The present disclosure relates generally to an improved communications system and in particular, to facilitating communications with a net zero transmission of power to a receiver of the communications.

2. Background

Wireless communications often involve the use of radio frequency signal transmissions. These and other types of transmissions transmit information by transmitting power through a medium or free space. In the case of the medium, the power transfer takes place in the form of density variations of the medium that are transverse or longitudinal to the wave propagation direction. In the case of free space, the power transfer takes place in the form of varying quantities of particles or the variation of phase, amplitude, polarization, wavelength, or angular momentum of one or more electromagnetic waves.

Wireless communications can include many different types of data. For example, wireless communications can include voice, video, images, data, program code, and other types of information. Wireless communications can enable sending this type of information long distances without needing physical wires or cables.

SUMMARY

An embodiment of the present disclosure provides a net zero energy communications system comprising a laser beam generator, a black body, a cooled cavity, an optical absorber in the cooled cavity, and a controller. The controller is configured to identify information for transmission. The controller is configured to control the laser beam generator to emit laser beam pulses at the optical absorber layer that changes a temperature of the optical absorber layer with a pattern that causes the optical absorber layer to emit black body radiation from the cooled cavity to thereby encode the information.

Another embodiment of the present disclosure provides a net zero power communications system comprising a laser beam generator, a black body, a cooled cavity, and a controller. The controller is configured to identify information for transmission. The controller is configured to control the laser beam generator to emit laser beam pulses through the cooled cavity in which the laser beam pulses have characteristics that simulate black body radiation in an environment around the black body system. The laser beam pulses have a pattern that encodes the information in simulated black body radiation.

Yet another embodiment of the present disclosure provides a net zero power communications system comprising a conduit and a transmitter. A fluid flows though the conduit. The transmitter is thermally connected to the conduit. The transmitter is configured to selectively remove heat from the fluid flowing by the transmitter to cause a pattern of temperature changes from an ambient temperature in the fluid to thereby encode information.

Yet another illustrative embodiment of the present disclosure provides a method for net zero power communications. Information is identified for transmission. Laser beam pulses are emitted at an optical absorber layer in a cooled cavity in a black body system that changes a temperature of the optical absorber layer with a pattern that causes the optical absorber layer to emit black body radiation from the cooled cavity to thereby encode the information.

Still another illustrative embodiment of the present disclosure provides a method for net zero power communications. Information is identified for transmission. Laser beam pulses are emitted through a cooled cavity in a black body system in which the laser beam pulses have characteristics that simulate black body radiation in an environment. The laser beam pulses have a pattern that encodes the information in simulated black body radiation.

Another illustrative embodiment of the present disclosure provides a method for net zero power communications. Information is identified for transmission. Each is removed from a fluid flowing in a conduit to cause a pattern of temperature changes from an ambient temperature in the fluid to thereby encode information.

Yet another illustrative embodiment of the present disclosure provides a method for net zero power communications. Information is identified for transmission. Power is removed from a transmission medium with a pattern based on the information, wherein the pattern causes power changes that encode the information in the transmission medium.

Another illustrative embodiment of the present disclosure provides a detection system for detecting net zero power communications. The detection system comprises a black body system with a cooled cavity, a radiation detector, and a controller. The radiation detector is configured to detect black body radiation. The controller is in communication with the radiation detector. The controller is configured to determine whether the black body radiation detected by the radiation detector has a pattern encoding information. The controller is configured to decode the information in the black body radiation in response to detecting the pattern.

Still another illustrative embodiment of the present disclosure provides a method for detecting information encoded by a net zero power communication system. Black body radiation is measured using a radiation detector in a cooled cavity in a black body system. A determination is made as to whether the black body radiation detected by the radiation detector has a pattern encoding information. The information in the black body radiation is decoded in response to detecting the pattern.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the power transfer involved in sending communications to a receiver can interfere with nearby devices or communication systems. For example, interference can occur when multiple devices transmit signals simultaneously. Further, the possibility of interference also increases when the same or overlapping frequencies are used.

Further, strong radio frequency signals can result in electromagnetic fields that can interfere with the normal operation of sensitive electronic devices such as computers, mobile phones, or Internet of Things (IoT) devices. Additionally, wireless communications that involve the transfer of power can result in issues with data privacy. Also, current communications techniques can have limited bandwidth because use of the existing spectrum for wireless communications systems. Additionally, wireless communications including optical signals can have high safety issues.

Information transmitted using power that is greater than the background noise, and does not have the characteristics of the background noise, can be detected. As a result, the possibility of intercepting and decoding information increases with this type of information transmission. Additionally, the use of power to transmit information such as the use of lasers can also have safety concerns such as eye safety. Further, the amount of bandwidth available is limited with transmission of information using electromagnetic fields at a level greater than background noise. For example, limited bandwidths are present for using radio frequency signals to transmit information.

Thus, it would be desirable to have an information transmission system that overcomes one or more of these different technical problems.

Thus, illustrative embodiments provide a method, apparatus, system, and computer program product for wireless communications that do not transmit power to a receiver or have a net zero transmission of power as compared to the background power in the environment. In one illustrative example, a net zero power communications system comprises a laser beam generator, a black body, a cooled cavity, an optical absorber in the cooled cavity, and a controller. The controller is configured to identify information for transmission. The controller is configured to control the laser beam generator to emit laser beam pulses at the optical absorber layer that changes a temperature of the optical absorber layer with a pattern that causes the optical absorber layer to emit black body radiation from the cooled cavity to thereby encode the information.

Figure 1:
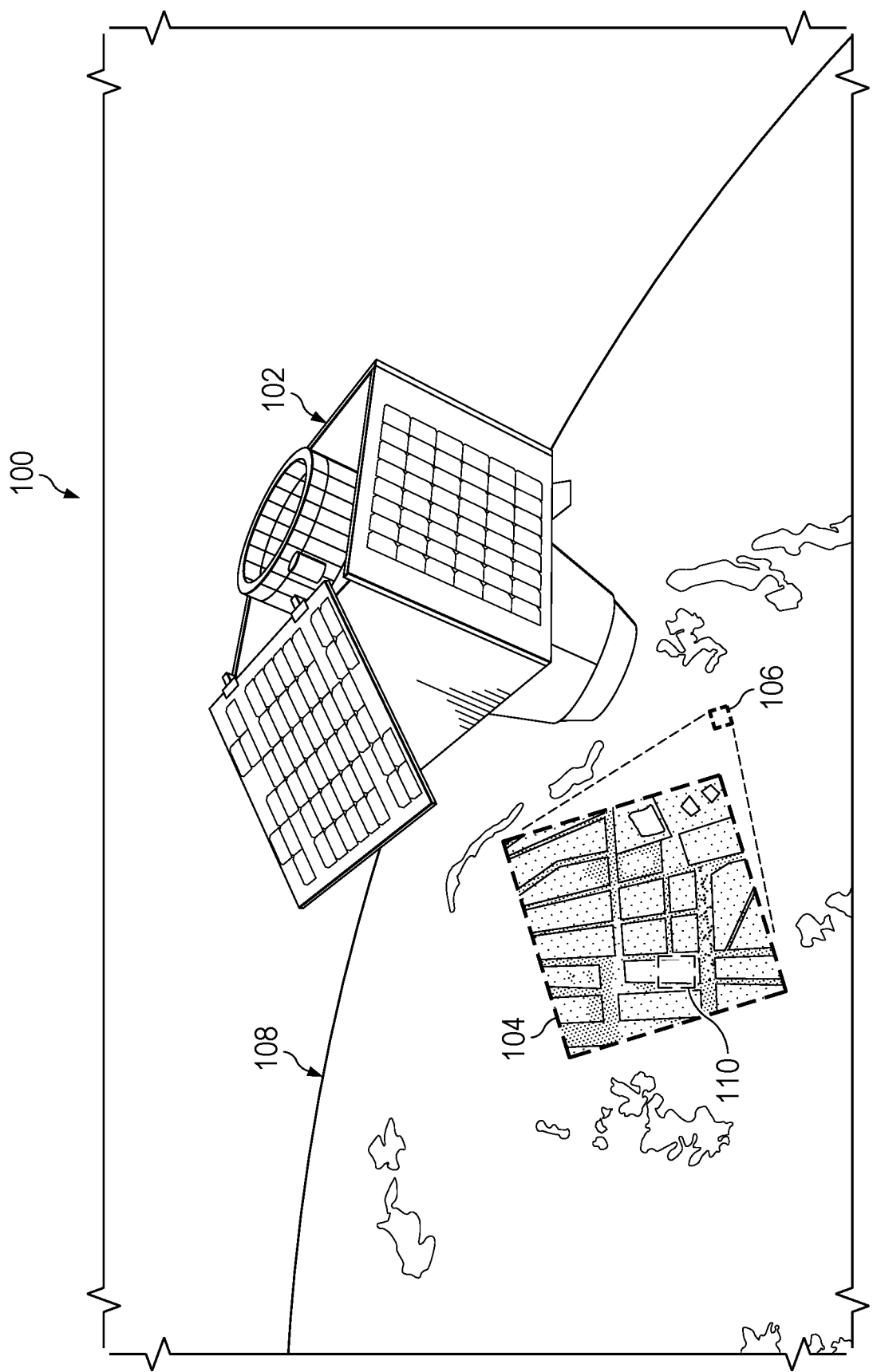
FIG. 1 is an illustration of a communications environment in accordance with an illustrative embodiment.

With reference now to the figures, and in particular with reference to FIG. 1, an illustration of a communications environment is depicted in accordance with an illustrative embodiment. In this illustrative example, communications environment 100 is an environment in which net zero power communications can occur. As depicted, satellite 102 is a receiver. As depicted, satellite 102 captures image 104 of region 106 on earth 108. In this example, image 104 is an image of the black body radiation emitted from region 106. In this example, image 104 can be analyzed to identify communications of information transmitted by a net zero power communications system (not shown). In this example, pixels in area 110 of image 104 have a color indicating an absence of black body radiation.

The absence of black body radiation is caused by a net zero power communications system located in area 110 that selectively reduces or removes power to suppress the transmission of black body radiation with a pattern over time that thereby encodes data for transmission. The pattern between an absence of black body radiation and black body radiation encodes information in this example.

Figure 2:
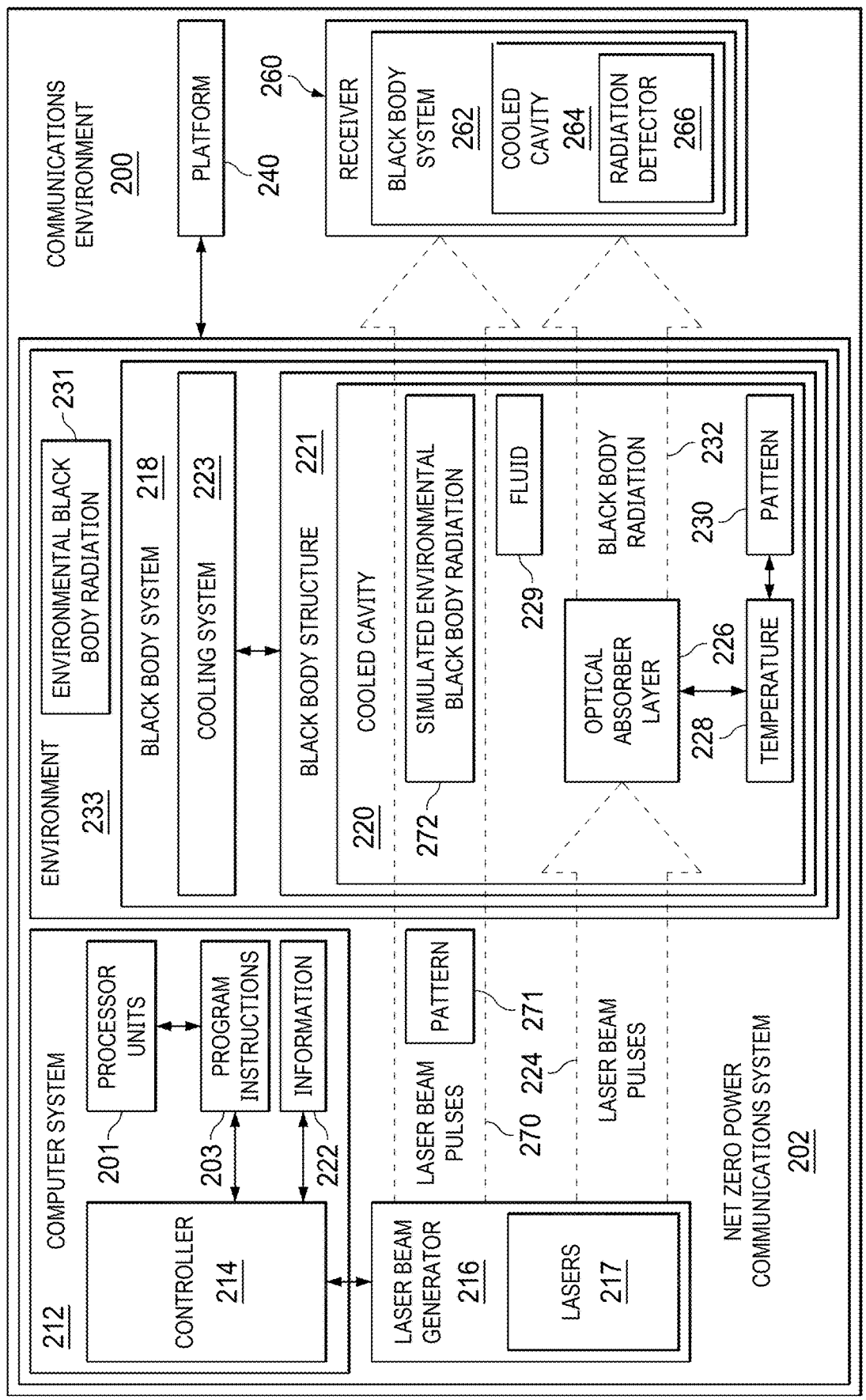
FIG. 2 is an illustration of a block diagram of a communications environment in accordance with an illustrative embodiment.

With reference now to FIG. 2, an illustration of a block diagram of a communications environment is depicted in accordance with an illustrative embodiment. Net zero power communications system 202 in communications environment 200 can communicate information 222 with net zero power. In this example, net zero power communications system 202 comprises computer system 212, controller 214, laser beam generator 216, and black body system 218 with cooled cavity 220.

Controller 214 can be implemented in software, hardware, firmware or a combination thereof. When software is used, the operations performed by controller 214 can be implemented in program instructions configured to run on hardware, such as a processor unit. When firmware is used, the operations performed by controller 214 can be implemented in program instructions and data and stored in persistent memory to run on a processor unit. When hardware is employed, the hardware can include circuits that operate to perform the operations in controller 214.

In the illustrative examples, the hardware can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 201 that are capable of executing program instructions 203 implementing processes in the illustrative examples. In other words, program instructions 203 are computer-readable program instructions.

As used herein, a processor unit in the number of processor units 201 is a hardware device and is comprised of hardware circuits such as those on an integrated circuit that respond to and process instructions and program code that operate a computer. When the number of processor units 201 executes program instructions 203 for a process, the number of processor units 201 can be one or more processor units that are in the same computer or in different computers. In other words, the process can be distributed between processor units 201 on the same or different computers in computer system 212.

Further, the number of processor units 201 can be of the same type or different types of processor units. For example, the number of processor units 201 can be selected from at least one of a single core processor, a dual-core processor, a multi-processor core, a general-purpose central processing unit (CPU), a graphics processing unit (GPU), a digital signal processor (DSP), or some other type of processor unit.

In this example, black body system 218 comprises black body structure 221 and cooling system 223. Cooled cavity 220 is located in black body structure 221. Black body structure 221 can be comprised of a material that can be cooled to a temperature such that an absence of black body radiation is present within cooled cavity 220. This material can be, for example, a metal, a ceramic, aluminum, titanium, or some other suitable material.

Cooling system 223 cools black body structure 221 such that black body radiation 232 is not emitted from cooled cavity 220 without changing the temperature of optical absorber layer 226. In this example, cooling system 223 is thermally connected to black body structure 221. Cooling of black body structure 221 also cools fluid 229 in cooled cavity 220.

In these illustrative examples, fluid 229 can be a gas or a liquid. A vacuum can also be considered a fluid when the vacuum is used as a medium for transmitting black body radiation. In this illustrative example, fluid 229 is air. In other illustrative examples, cooling system 223 can cool fluid 229 in cooled cavity 220.

In this example, fluid 229 is a transmission medium from which power is removed to avoid or prevent the transmission of black body radiation 232. Black body radiation is transmitted when power is not removed from fluid 229 such as black body radiation 232 generated by optical absorber layer 226. Thus, the power changes reflected by presence or absence of black body radiation encodes the information that is transmitted through fluid 229.

In this example, laser beam generator 216 is a hardware system that comprises a number of lasers 217. In this illustrative example, each of these lasers can emit laser beam pulses 270.

In this depicted illustrative example, controller 214 identifies information 222 for transmission. Controller 214 controls laser beam generator 216 to emit laser beam pulses 224 at the optical absorber layer 226 in cooled cavity 220 in black body system 218 that changes temperature 228 of optical absorber layer 226 with pattern 230 that causes the optical absorber layer 226 to emit black body radiation 232 from cooled cavity 220 that thereby encodes information 222. Pattern 230 of heating and cooling caused by optical absorber layer 226 encodes information 222 and black body radiation 232 emitted from cooled cavity 220.

In this illustrative example, black body radiation 232 is emitted from optical absorber layer 226 in cooled cavity 220 in response to changing temperature 228 of optical absorber layer 226. Black body system 218 cools optical absorber layer 226 and fluid 229 in cooled cavity 220 such that black body radiation 232 is not transmitted from cooled cavity 220 without laser beam pulses 224 increasing temperature 228 of optical absorber layer 226.

Further, in this example, optical absorber layer 226 is comprised of a material that can absorb laser light and convert that power in the laser light into kinetic power that causes heat that temporarily increases temperature 228 in cooled cavity 220 resulting in the black body radiation 232. For example, optical absorber layer 226 can be comprised of one or more materials selected from at least one of a metal, a metal alloy, aluminum, a ceramic, a plastic, a glass, a semiconductor, a nanostructure, or other suitable material.

The selection of a particular material can be based on the heat capacity of the material. For example, material can be selected that has a lower capacity that enables optical absorber layer 226 to change temperature more quickly as compared to material with a higher heat capacity. As a result, the data rate can be increased through the selection of one or more materials for optical absorber layer 226. Further, material can be selected as one that enhances emissivity and thermal conductivity while reducing specific heat such as quantum wells, quantum wires, and quantum dots.

In this example, laser beam pulses 224 that impact optical absorber layer 226 cause optical absorber layer 226 to change temperature 228 with pattern 230 that heats and cools cooled cavity 220 in a manner that causes emission of black body radiation 232 that encodes information 222.

In this illustrative example, information 222 can be encoded in black body radiation 232 as digital data. With this example, black body radiation 232 represents a logic 0 and an absence of black body radiation 232 represents a logic 1. Alternatively, black body radiation 232 can represent a logic 1 and an absence of black body radiation 232 can represent a logic 0.

In yet another illustrative example, information 222 can be encoded in black body radiation 232 as analog data. With analog data, the transmission rates can be slower than with digital data.

Further in this example, black body radiation 232 emitted from cooled cavity 220 by optical absorber layer 226 has characteristics of environmental black body radiation 231 in an environment 233 around the black body system.

In another illustrative example, optical absorber layer 226 can be omitted from cooled cavity 220. With this example, controller 214 identifies information 222 for transmission. With the identification of information 222, controller 214 controls laser beam generator 216 to emit laser beam pulses 270 through cooled cavity 220 in which laser beam pulses 270 have characteristics that simulate environmental black body radiation 231 in environment 233 around the black body system. In this example, laser beam pulses 224 form simulated environmental black body radiation 272 having pattern 271 that encodes information 222 in simulated environmental black body radiation 272. Laser beam pulses 270 form simulated environmental black body radiation 272. Without simulated environmental black body radiation 272, absence of environmental black body radiation 231 is present in the location of black body structure 221.

This simulated environmental black body radiation is in place of the absence of black body radiation being emitted from cooled cavity 220. In this example, pattern 271 between simulated environmental black body radiation 272 and an absence of simulated environmental black body radiation 272 encodes information 222.

In this example, receiver 260 detects black body radiation 232 encoding information 222 in black body radiation 232. Receiver 260 can also detect simulated environmental black body radiation 272 encoding information 222 in simulated environmental black body radiation 272. In this example, receiver 260 comprises black body system 262 with cooled cavity 264. Radiation detector 266 is located in cooled cavity 264.

Radiation detector 266 can take a number of different forms. For example, radiation detector 266 can be a camera, infrared thermography camera, a Golay cell detector system, a quantum well infrared photodetector system, an infrared fiber optic sensor system, and other suitable types of sensor systems that can detect black body radiation.

In this illustrative example, radiation detector 266 is located in cooled cavity 264 in black body system 262 to reduce or avoid the detection of black body radiation in the environment around receiver 260. As a result, receiver 260 can be pointed at different locations to measure black body radiation emanating from those locations.

In this illustrative example, net zero power communications system 202 can be located in platform 240. For example, laser beam generator 216, black body system 218, optical absorber layer 226, and controller 214 can be located in platform 240. Platform 240 can be selected from a group comprising a stationary platform, a mobile platform, a ground station, a vehicle, a surface ship, and other suitable platforms.

In one illustrative example, one or more technical solutions are present that overcome a technical problem with issues such as data privacy, eye safety, and bandwidth availability. As a result, one or more technical solutions may provide an ability to transmit information with increased data privacy through net zero transmissions of information. Further, since information is transmitted based on black body radiation, eye safety issues are reduced or absent. The illustrative examples also enable increasing the bandwidth available for transmitting information because this type of information transmission does not use currently available transmission mechanisms and their bandwidths. These systems do not use patterns in an absence of black body radiation to encode and transmit information.

The illustration of communications environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more black body structures can be present in addition to or in place of black body structure 221. Each of these black body structures can receive laser beam pulses from laser beam generator 216. In one example, multiple lasers are present that can generate these laser beam pulses. In another illustrative example, optical elements can be used to generate multiple laser beam pulses from a single laser.

Figure 3:
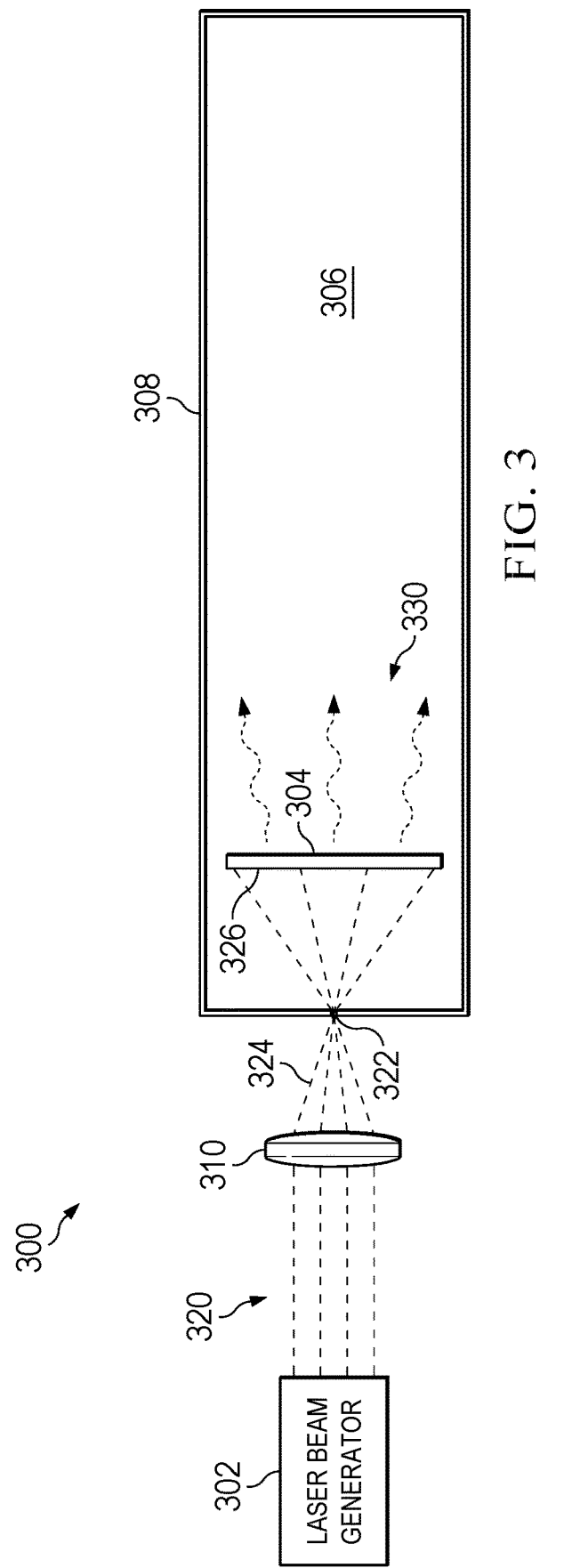
FIG. 3 is an illustration of a schematic diagram for transmitting information using net zero power in accordance with an illustrative embodiment.

Turning next to FIG. 3, an illustration of a schematic diagram for transmitting information using net zero power is depicted in accordance with an illustrative embodiment. In this illustrative example, net zero power transmission system 300 is an example of an implementation for net zero power communications system 202.

As depicted in this example, net zero power transmission system 300 comprises laser beam generator 302, aluminum foil 304 in cooled cavity 306, black body structure 308, and lens 310. Aluminum foil 304 is an example of an optical absorber layer. In this example, aluminum foil 304 is selected as having high emissivity and low specific heat capacity. Aluminum foil 304 has close to 1 with respect to emissivity. The value of 1 represent a perfect emitter on scale of 0 to 1. In other words, aluminum foil 304 is efficient at emitting thermal radiation response to laser beam pulses 320. In this example, aluminum foil 304 is about 100 nanometers thick.

Black body structure 308 can be tube in which liquid nitrogen is present in cooled cavity 306.

In this example, a laser beam is modulated to form laser beam pulses 320 that are emitted from laser beam generator 302. In this example, lens 310 is located between laser beam generator 302 and black body structure 308. Lens 310 is configured to focus and collimate laser beam pulses 320 in response to their passing through the lens 310 as focused collimated laser beam pulses 324.

Pinhole 322 is located in black body structure 308. Focused collimated laser beam pulses 324 passing through pinhole 322, spread out to strike surface 326 of aluminum foil 304, which is the optical absorber layer in this example. Pinhole 322 allows for light to enter the cooled cavity 306 for heating while simultaneously limiting the amount of black body radiation escaping the cavity causing it to cool.

Aluminum foil 304 absorbs these laser beam pulses. In response, aluminum foil 304 radiates the power as black body radiation 330. Black body radiation 330 is radiated with a pattern that encodes information that has been selected for transmission. In other words, a pattern between the emission of black body radiation 330 and an absence of black body radiation 330 encodes information that is to be transmitted using black body radiation 330. In this example, the data rate can be limited by the thermodynamic properties of aluminum foil 304.

Figure 4:
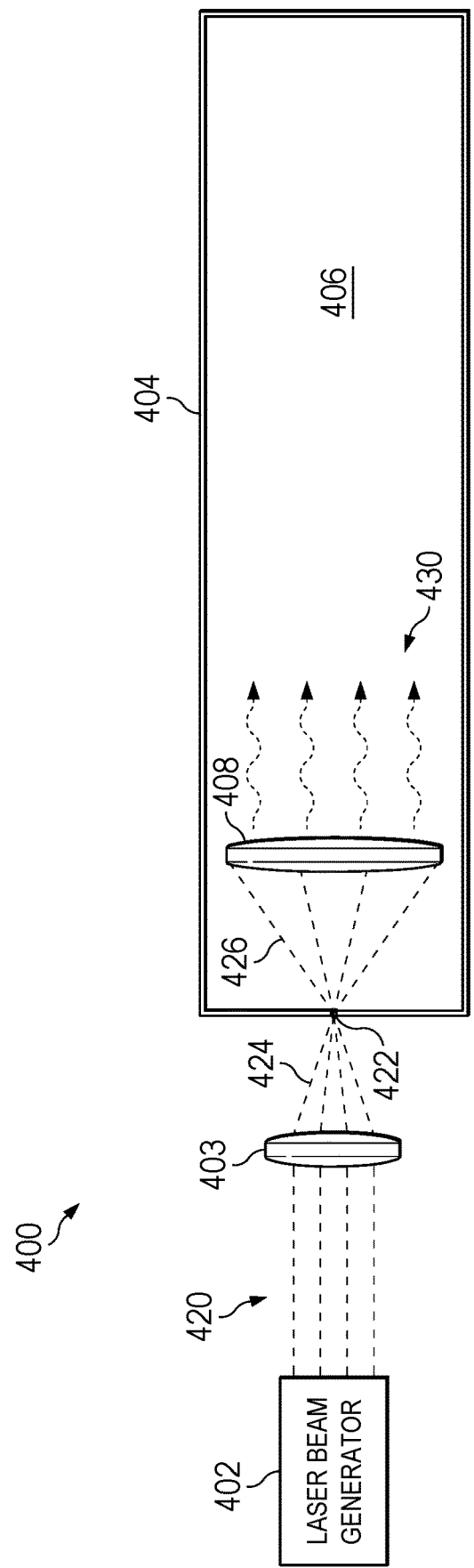
FIG. 4 is an illustration of a schematic diagram for transmitting information using net zero power in accordance with an illustrative embodiment.

Turning now to FIG. 4, an illustration of a schematic diagram for transmitting information using net zero power is depicted in accordance with an illustrative embodiment. In this illustrative example, net zero power transmission system 400 is an example of an implementation for net zero power communications system 202.

As depicted in this example, net zero power transmission system 400 comprises laser beam generator 402, lens 403, black body structure 404, cooled cavity 406 in black body structure 404, and collimating lens 408 in cooled cavity 406.

In this example, lens 403 is located between laser beam generator 402 and black body structure 404. Laser beam generator 402 modulates a laser beam to form laser beam pulses 420. Lens 403 focuses and collimates laser beam pulses 420 in response to their passing through lens 403 as focused collimated laser beam pulses 424 and directed through pinhole 422 in black body structure 404.

In this example, focused collimated laser beam pulses 424 passing through pinhole 422 spread out to form divergent laser beam pulses 426. In this example, these divergent laser beam pulses 426 pass through collimating lens 408. Collimating lens 408 collimates divergent laser beam pulses 426 to form simulated environmental black body radiation 430.

Figure 5:
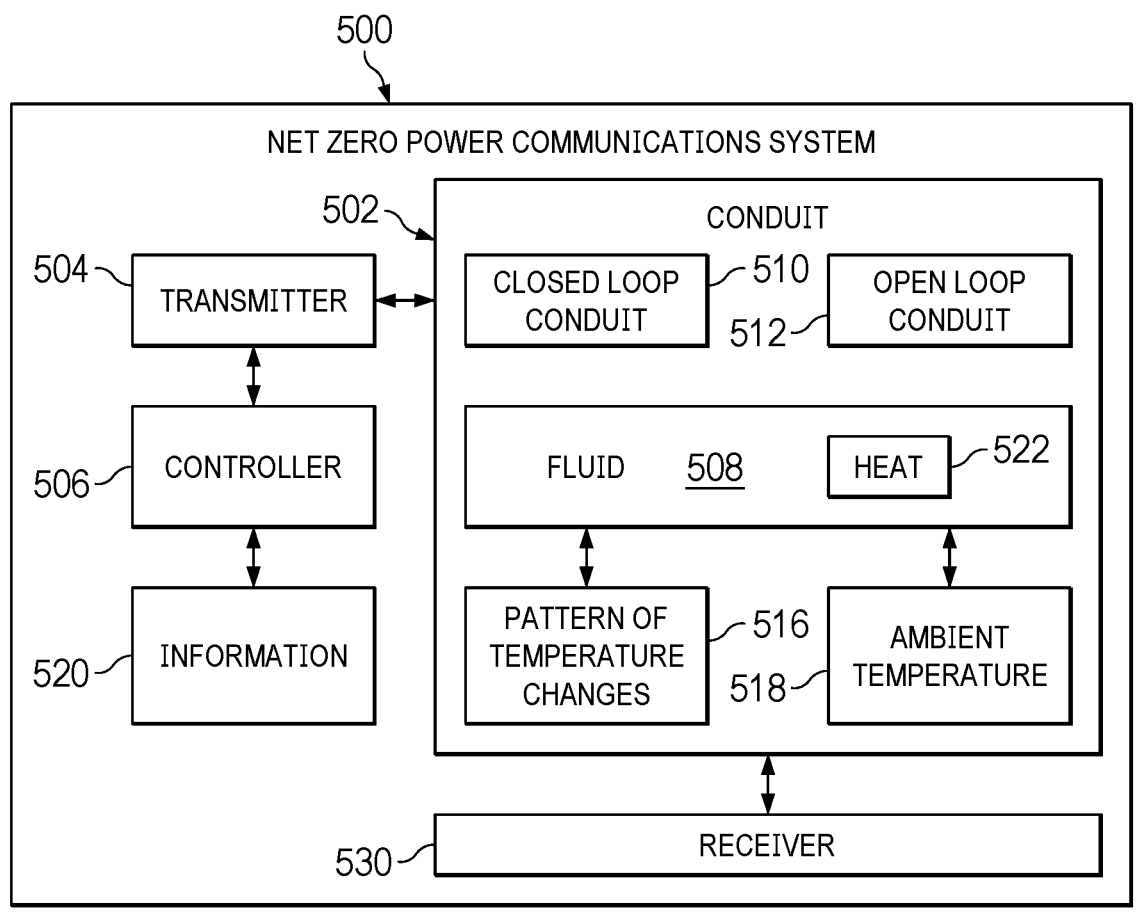
FIG. 5 is an illustration of a block diagram of a net zero power communications system in accordance with an illustrative embodiment.

With reference now to FIG. 5, an illustration of a block diagram of a net zero power communications system is depicted in accordance with an illustrative embodiment. In this example, net zero power communications system 500 comprises conduit 502, transmitter 504, and controller 506.

In this example, fluid 508 flows through conduit 502. Fluid 508 can be, for example, a gas or a liquid. Conduit 502 can be closed loop conduit 510 such that fluid by weight can recirculate within closed loop conduit 510. In another example, conduit 502 can be open loop conduit 512. In this case, fluid 508 does not recirculate.

In this illustrative example, transmitter 504 is thermally connected to conduit 502. Transmitter 504 can selectively remove heat from fluid 508 flowing by the transmitter 504 to cause a pattern of temperature changes 516 in fluid 508 from ambient temperature 518 in the fluid 508 to thereby encode information 520 for transmission.

Further, in this example, the removal of heat from fluid 508 is a removal of power from a transmission medium, which is fluid 508 in this example. Thus, the power changes reflected by the temperature changes encodes the information in fluid 508.

With the identification of information 520, controller 506 controls transmitter 504 to selectively remove heat 522 from fluid 508. This removal of heat 522 is formed in a manner that results in pattern of temperature changes 516 that encodes information 520.

For example, fluid 508 at ambient temperature 518 represents a logic 0 and fluid 508 at a temperature lower than ambient temperature 518 represents a logic 1. In another example, fluid 508 at ambient temperature 518 represents a logic 1 and fluid 508 at a temperature lower than ambient temperature 518 represents a logic 0.

In this depicted example, net zero power communications system 500 can also include receiver 530. Receiver 530 is thermally connected to conduit 502. Receiver 530 is configured to decode information 520 encoded in pattern of temperature changes 516 for fluid 508.

Figure 6:
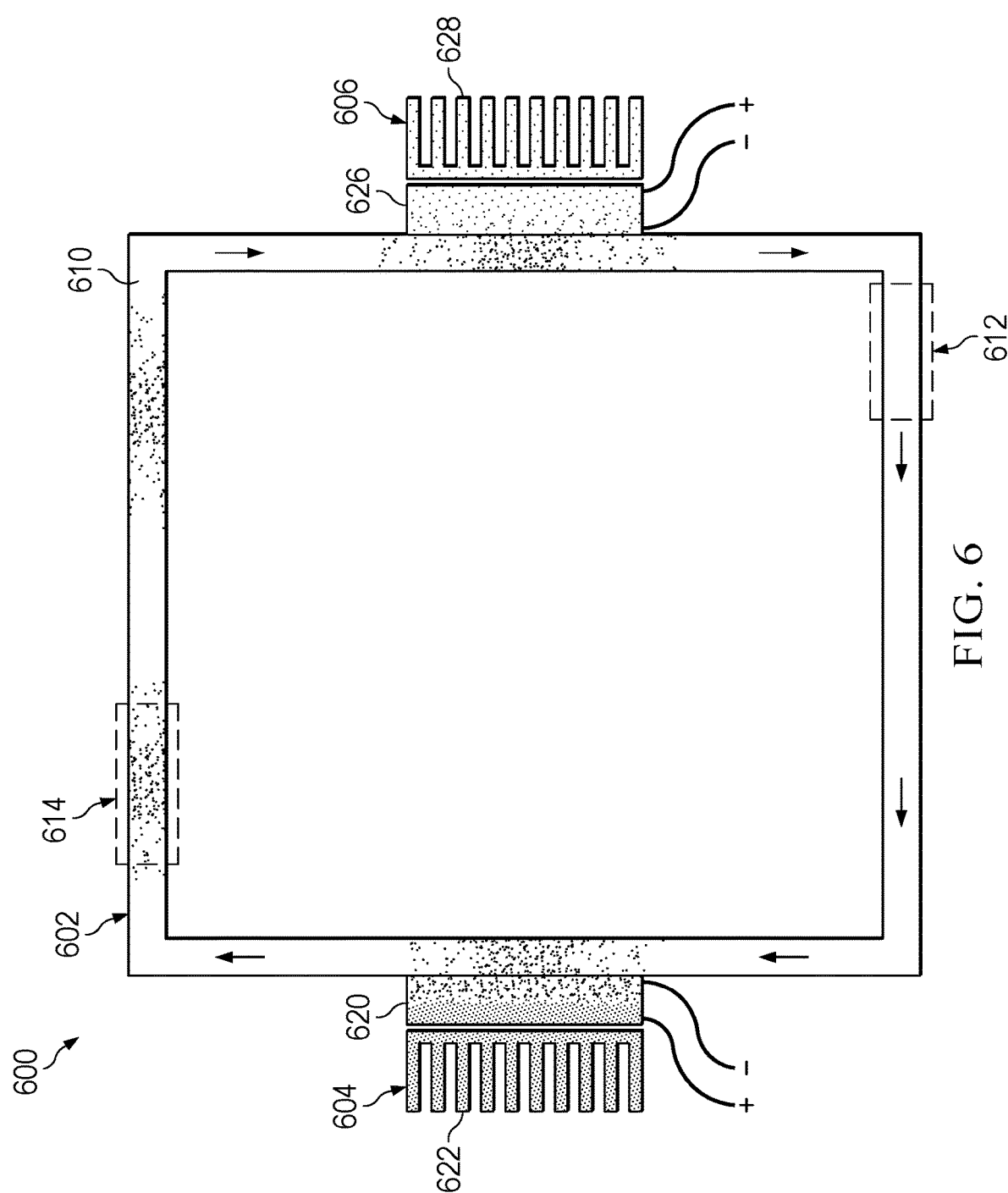
FIG. 6 is an illustration of a net zero power communications system in accordance with an illustrative embodiment.

Turning next to FIG. 6, an illustration of a net zero power communications system is depicted in accordance with an illustrative embodiment. In this example, net zero power communications system 600 is an example of an implementation for net zero power communications system 500 in FIG. 5.

In this example, net zero power communications system 600 includes conduit 602, transmitter 604, and receiver 606.

In this example, conduit 602 is a close loop conduit. Fluid 610 is located in conduit 602 and flows in a clockwise direction. Fluid can be a gas or a liquid. In this example, fluid 610 in section 612 is at ambient temperature. Fluid 610 in section 614 has a temperature that is lower than the ambient temperature for fluid 610.

In this example, transmitter 604 and receiver 606 are thermoelectric coolers. These devices are also referred to as Peltier coolers. These coolers operate using a physical phenomenon referred to as a Peltier effect. A temperature difference is created by applying a voltage difference across two types of semiconductors in these devices. The semiconductors arranged in pairs are referred to as thermocouples. As an electric current passes through the thermocouples, heat flux occurs resulting in one side becoming warmer and the other side becoming cooler.

In this example, the application of current to transmitter 604 causes conduit side 620 to become cooler than radiating side 622. As a result, heat is drawn from fluid 610 resulting in fluid 610 becoming cooler than ambient temperature. Transmitter 604 can cool fluid 610 in a pattern that encodes data through a pattern of temperature changes in fluid extent.

In this example, as fluid passes by receiver 606, a colder temperature is present on conduit side 626 as compared to radiating side 628. As a result, the colder temperature of fluid 610 passes by receiver 606 and a difference between the thermocouples results in the generation of current or power in this example. As the pattern of temperature changes between the cooler temperature and ambient temperature, the information encoded in fluid 610 is decoded by receiver 606. Receiver 606 generates electrical signals representing the information in response to detecting the pattern of temperature changes.

In this illustrative example, transmitter 604 can also operate as receiver. In a similar fashion, receiver 606 can also operate as a transmitter.

Figure 7:
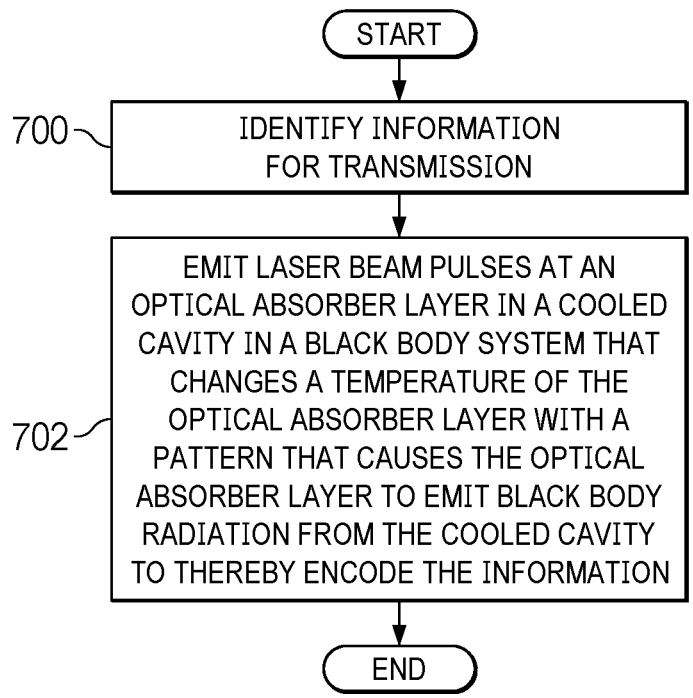
FIG. 7 is an illustration of a flowchart of a process for net zero power communications in accordance with an illustrative embodiment.

Turning next to FIG. 7, an illustration of a flowchart of a process for net zero power communications is depicted in accordance with an illustrative embodiment. The process in FIG. 7 can be implemented in hardware, software, or both. When implemented in software, the process can take the form of program instructions that are run by one of more processor units located in one or more hardware devices in one or more computer systems. For example, the process can be implemented in controller 214 in net zero power communications system 202 in FIG. 2.

The process identifies information for transmission (operation 700). The process emits laser beam pulses at an optical absorber layer in a cooled cavity in a black body system that changes a temperature of the optical absorber layer with a pattern that causes the optical absorber layer to emit black body radiation from the cooled cavity to thereby encode the information (operation 702). The process terminates thereafter.

Figure 8:
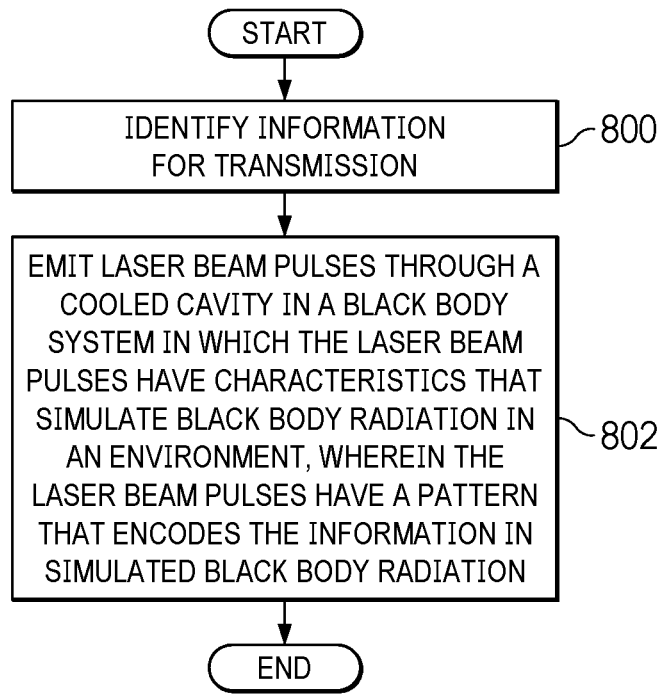
FIG. 8 is an illustration of a flowchart of a process for net zero power communications in accordance with an illustrative embodiment.

With reference to FIG. 8, an illustration of a flowchart of a process for net zero power communications is depicted in accordance with an illustrative embodiment. The process in FIG. 8 can be implemented in hardware, software, or both. When implemented in software, the process can take the form of program instructions that are run by one of more processor units located in one or more hardware devices in one or more computer systems. For example, the process can be implemented in controller 214 in net zero power communications system 202 in FIG. 2.

The process identifies information for transmission (operation 800). The process emits laser beam pulses through a cooled cavity in a black body system in which the laser beam pulses have characteristics that simulate black body radiation in an environment, wherein the laser beam pulses have a pattern that encodes the information in simulated black body radiation (operation 802). The process terminates thereafter.

Figure 9:
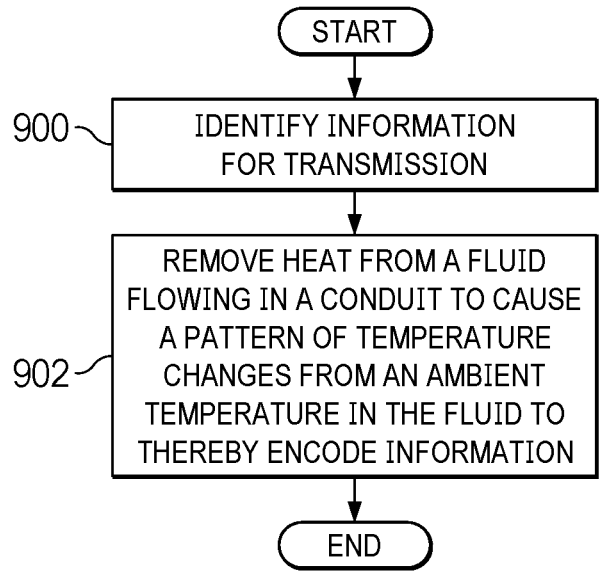
FIG. 9 is an illustration of a flowchart of a process for net zero power communications in accordance with an illustrative embodiment.

Next in FIG. 9, an illustration of a flowchart of a process for net zero power communications is depicted in accordance with an illustrative embodiment. The process in FIG. 9 can be implemented in hardware, software, or both. When implemented in software, the process can take the form of program instructions that are run by one of more processor units located in one or more hardware devices in one or more computer systems. For example, the process can be implemented in controller 506 in net zero power communications system 500 FIG. 5.

The process identifies information for transmission (operation 900). The process removes heat from a fluid flowing in a conduit to cause a pattern of temperature changes from an ambient temperature in the fluid to thereby encode information (operation 902). The process terminates thereafter.

Figure 10:
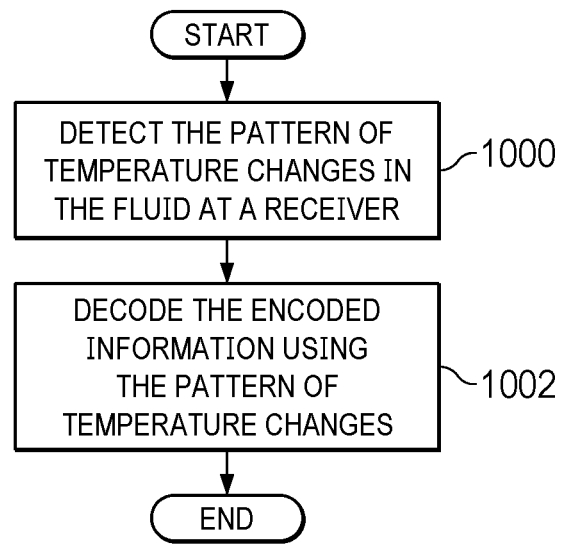
FIG. 10 is an illustration of a flowchart of a process for decoding information from a fluid in accordance with an illustrative embodiment.

Turning to FIG. 10, an illustration of a flowchart of a process for decoding information from a fluid is depicted in accordance with an illustrative embodiment. The process in this figure is an example of additional operations that can be performed in the flowchart in FIG. 9.

The process detects the pattern of temperature changes in the fluid at a receiver (operation 1000). The process decodes the encoded information using the pattern of temperature changes (operation 1002). The process terminates thereafter.

Figure 11:
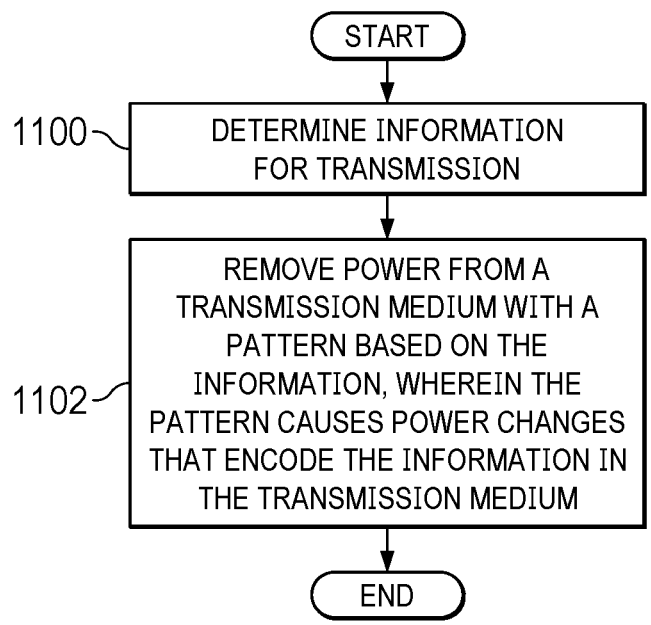
FIG. 11 is an illustration of a flowchart of a process for net zero power communications in accordance with an illustrative embodiment.

Turning next to FIG. 11, an illustration of a flowchart of a process for net zero power communications is depicted in accordance with an illustrative embodiment. The process in FIG. 11 can be implemented in hardware, software, or both. When implemented in software, the process can take the form of program instructions that are run by one of more processor units located in one or more hardware devices in one or more computer systems. For example, the process can be implemented in controller 214 in net zero power communications system 202 in FIG. 2 or in controller 506 in net zero power communications system 500 in FIG. 5.

The process determines information for transmission (operation 1100). The process removes power from a transmission medium with a pattern based on the information, wherein the pattern causes power changes that encode the information in the transmission medium (operation 1102). The process terminates thereafter.

In step 1102, the medium can be a fluid such as a gas or liquid. The power can be removed in a number of different ways. For example, the power can be removed by cooling a cooled cavity in a black body structure and a black body system. In another example, the fluid can be in a conduit that is cooled by a thermoelectric cooler removing power from the fluid in the conduit. The power changes can be whether black body radiation is emitted or whether changes occur in the temperature of the fluid.

Figure 12:
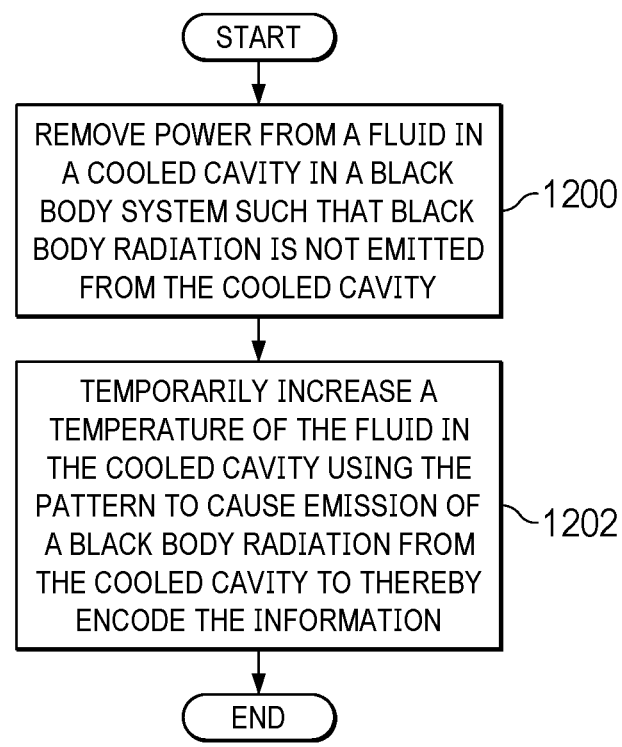
FIG. 12 is an illustration of a flowchart of a process for net zero power communications in accordance with an illustrative embodiment.

Turning next to FIG. 12, an illustration of a flowchart of a process for net zero power communications is depicted in accordance with an illustrative embodiment. The process in FIG. 12 is an example of an implementation for step 1102 in FIG. 11. This process can be implemented using controller 214 in net zero power communications system 202 in FIG. 2.

The process removes power from a fluid in a cooled cavity in a black body system such that black body radiation is not emitted from the cooled cavity (operation 1200). The process temporarily increases a temperature of the fluid in the cooled cavity using the pattern to cause emission of a black body radiation from the cooled cavity to thereby encode the information (1202). The process terminates thereafter.

Figure 13:
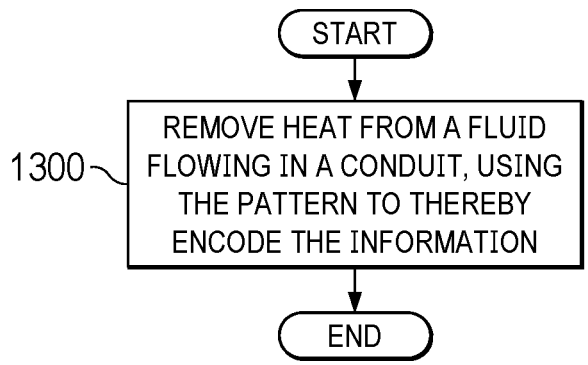
FIG. 13 is an illustration of a flowchart of a process for net zero power communications in accordance with an illustrative embodiment.

In FIG. 13, an illustration of a flowchart of a process for net zero power communications is depicted in accordance with an illustrative embodiment. The process in FIG. 13 is an example of an implementation for step 1102 in FIG. 11. This process can be implemented using controller 506 in net zero power communications system 500 in FIG. 5.

The process removes heat from a fluid flowing in a conduit, using the pattern to thereby encode the information (operation 1300). The process terminates thereafter.

Figure 14:
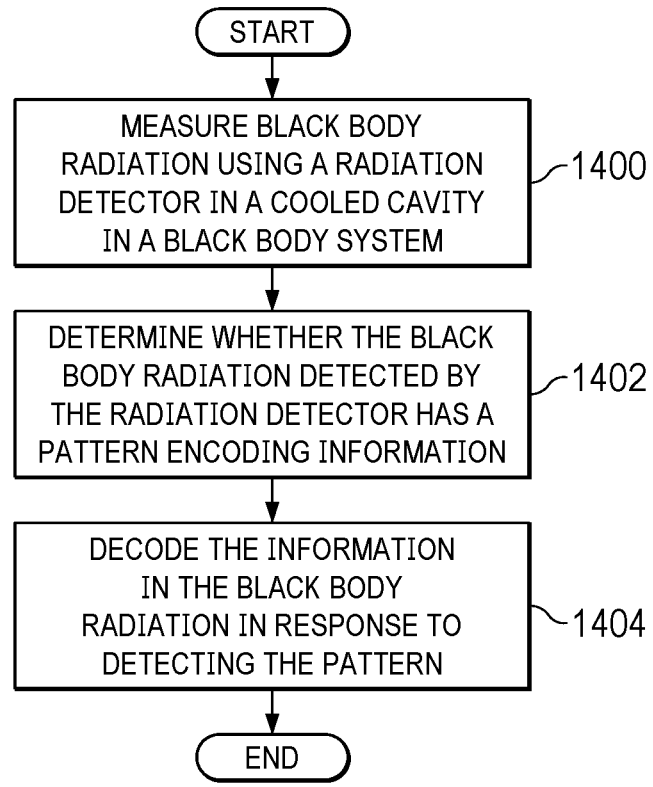
FIG. 14 is an illustration of a flowchart of a process for detecting net zero power communications in accordance with an illustrative embodiment.

Turning next to FIG. 14, an illustration of a flowchart of a process for detecting net zero power communications is depicted in accordance with an illustrative embodiment. The process in FIG. 14 can be implemented in hardware, software, or both. When implemented in software, the process can take the form of program instructions that are run by one of more processor units located in one or more hardware devices in one or more computer systems. This process can be implemented using receiver 260 in net zero power communications system 202 in FIG. 2.

The process measures black body radiation using a radiation detector in a cooled cavity in a black body system (operation 1400). The process determines whether the black body radiation detected by the radiation detector has a pattern encoding information (operation 1402).

The process decodes the information in the black body radiation in response to detecting the pattern (operation 1404). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Thus, illustrative embodiments provide a method, apparatus, and system, for net zero communications. In one illustrative example, a net zero power communications system comprising a laser beam generator, a black body, a cooled cavity, an optical absorber in the cooled cavity, and a controller. The controller is configured to identify information for transmission. The controller is configured to control the laser beam generator to emit laser beam pulses at the optical absorber layer that changes a temperature of the optical absorber layer with a pattern that causes the optical absorber layer to emit black body radiation from the cooled cavity to thereby encode the information.

As a result, one or more illustrative examples overcome issues with at least one of data privacy, eye safety, or bandwidth availability. One or more of the illustrative examples provide an ability to transmit information with increased data privacy through net zero transmissions of information. Further, since information is transmitted based on black body radiation, eye safety issues are reduced or absent. The illustrative examples also enable increasing the bandwidth available for transmitting information because this type of information transmission does not use currently available transmission mechanisms and their bandwidths.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes," "including," "has," "contains," and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A net zero power communications system comprising:
    a laser beam generator;
    a black body system with a cooled cavity;
    an optical absorber layer in the cooled cavity; and
    a controller configured to:
        identify information for transmission; and
        control the laser beam generator to emit laser beam pulses at the optical absorber layer that changes a temperature of the optical absorber layer with a pattern that causes the optical absorber layer to emit black body radiation from the cooled cavity to thereby encode the information.

2. The net zero power communications system of claim 1, wherein the black body system is configured to cool the optical absorber layer and a liquid in the cooled cavity such that black body radiation is not transmitted from the cooled cavity without the laser beam pulses increasing the temperature of the optical absorber layer.

3. The net zero power communications system of claim 1, wherein the black body radiation emitted from the cooled cavity by the optical absorber layer has characteristics of environmental black body radiation in an environment around the black body system.

4. The net zero power communications system of claim 1, wherein the black body system comprises:
    a black body structure containing the cooled cavity; and
    a cooling system configured to cool the black body structure such that black body radiation is not emitted from the cooled cavity without changing the temperature of the optical absorber layer.

5. The net zero power communications system of claim 4, further comprising:
    a lens, located between the laser beam generator and the black body structure, wherein the lens is configured to focus and collimate the laser beam pulses in response to their passing through the lens as focused collimated laser beam pulses; and
    a pinhole in the black body structure, wherein the focused collimated laser beam pulses passing through the pinhole are configured to spread out to strike a surface of the optical absorber layer.

6. The net zero power communications system of claim 1, wherein the black body radiation is configured to be emitted from the optical absorber layer in the cooled cavity in response to changing the temperature of the optical absorber layer.

7. The net zero power communications system of claim 1, wherein the optical absorber layer is comprised of a material selected from at least one of a metal, a metal alloy, aluminum, a ceramic, a plastic, a glass, a semiconductor, or a nanostructure.

8. The net zero power communications system of claim 1, wherein the information is encoded in the black body radiation as digital data.

9. The net zero power communications system of claim 1, wherein the information is encoded in the black body radiation as analog data.

10. The net zero power communications system of claim 1, wherein the laser beam generator, the black body system, the optical absorber layer, and the controller are located in a platform selected from a group comprising a stationary platform, a mobile platform, a ground station, a vehicle, and a surface ship.

11. The net zero power communications system of claim 1, wherein the black body radiation represents a logic 0 and an absence of the black body radiation represents a logic 1.

12. The net zero power communications system of claim 1, wherein the black body radiation represents a logic 1 and an absence of the black body radiation represents a logic 0.

13. A net zero power communications system comprising:
    a laser beam generator;
    a black body system with a cooled cavity; and
    a controller configured to:
        identify information for transmission; and control the laser beam generator to emit laser beam pulses through the cooled cavity in which the laser beam pulses have characteristics that simulate environmental black body radiation in an environment around the black body system, wherein the laser beam pulses form simulated environmental black body radiation having a pattern that encodes the information.

14. The net zero power communications system of claim 13, wherein the black body system comprises:
   a black body structure containing the cooled cavity; and
   a cooling system configured to cool the black body structure such that black body radiation is not emitted from the cooled cavity without the laser beam pulses passing through the cooled cavity, wherein the laser beam pulses have characteristics that simulate the environmental black body radiation in the environment around the black body system.

15. The net zero power communications system of claim 14, further comprising:
   a lens, located between the laser beam generator and the black body structure, wherein the lens is configured to focus and collimate the laser beam pulses in response to their passing through the lens as focused collimated laser beam pulses;
   a pinhole in the black body structure, wherein the focused collimated laser beam pulses passing through the pinhole are configured to spread out to form divergent laser beam pulses; and
   a collimating lens configured to collimate the divergent laser beam pulses.

16. The net zero power communications system of claim 13, wherein the information is encoded as digital data in the laser beam pulses and has characteristics that simulate black body radiation.

17. The net zero power communications system of claim 13, wherein the information is encoded as analog data in the laser beam pulses and has characteristics that simulate black body radiation.

18. The net zero power communications system of claim 13, wherein the simulated black body radiation represents a logic 0 and an absence of the simulated black body radiation represents a logic 1.

19. The net zero power communications system of claim 13, wherein the simulated black body radiation represents a logic 1 and an absence of the simulated black body radiation represents a logic 0.

20. A method for net zero power communications comprising:
   identifying information for transmission; and
   emitting laser beam pulses at an optical absorber layer in a cooled cavity in a black body system that changes a temperature of the optical absorber layer with a pattern that causes the optical absorber layer to emit black body radiation from the cooled cavity to thereby encode the information.

21. The method of claim 20, wherein the black body system is configured to cool the optical absorber layer and a liquid in the cooled cavity such that black body radiation is not transmitted from the cooled cavity without the laser beam pulses increasing the temperature of the optical absorber layer.

22. The method of claim 20, wherein the black body radiation emitted from the cooled cavity by the optical absorber layer has characteristics of environmental black body radiation in an environment around the black body system.

23. The method of claim 20, wherein the black body system comprises:
   a black body structure containing the cooled cavity; and
   a cooling system configured to cool the black body structure such that black body radiation is not emitted from the cooled cavity without changing the temperature of the optical absorber layer.

24. The method of claim 20, wherein the laser beam is emitted by a laser beam generator, a lens is located between the laser beam generator and the black body structure, wherein the lens is configured to focus and collimate the laser beam pulses in response to their passing through the lens as focused collimated laser beam pulses; and a pinhole is in the black body structure, wherein the focused collimated laser beam pulses passing through the pinhole are configured to spread out to strike a surface of the optical absorber layer.

25. The method of claim 20, wherein the black body radiation is configured to be emitted from the optical absorber layer in the cooled cavity in response to changing the temperature of the optical absorber layer.

26. The method of claim 20, wherein the optical absorber layer is comprised of a material selected from at least one of a metal, a metal alloy, aluminum, a ceramic, a plastic, a glass, a semiconductor, or a nanostructure.

27. The method of claim 20, wherein the information is encoded in the black body radiation as digital data.

28. The method of claim 20, wherein the information is encoded in the black body radiation as analog data.

\* \* \* \* \*